V. O. JARVIS.
AUTOMATIC RELIEF VALVE FOR TIRES.
APPLICATION FILED JUNE 9, 1913.

1,104,902.

Patented July 28, 1914.

Witnesses:

Inventor
Virgil O. Jarvis

UNITED STATES PATENT OFFICE.

VIRGIL O. JARVIS, OF HANFORD, CALIFORNIA.

AUTOMATIC RELIEF-VALVE FOR TIRES.

1,104,902.  Specification of Letters Patent.  Patented July 28, 1914.

Application filed June 9, 1913.  Serial No. 772,497.

*To all whom it may concern:*

Be it known that I, VIRGIL O. JARVIS, a citizen of the United States, residing at Hanford, in the county of Kings and State of California, have invented a new and useful Automatic Relief-Valve for Tires, of which the following is a specification.

This invention relates to an automatic relief valve for tires, and has for its object to provide a device which may be screwed to the outer end of a tire valve stem, and which will operate to automatically relieve the pressure in the tire when the pressure in the tire increases to a certain point.

A further object is to so construct the device that it may be adjusted to cause the pressure to be released at the desired point.

A further object of the invention is to so construct the device that it will be contained within the usual dust cap on the valve stem.

Figure 1:
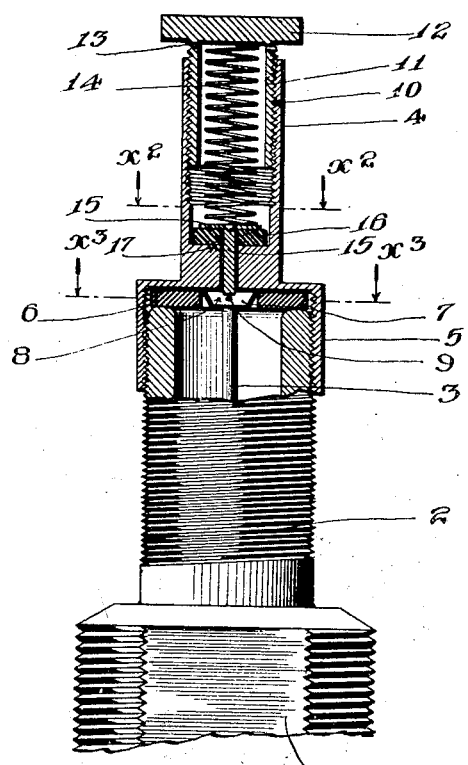
Figure 4:
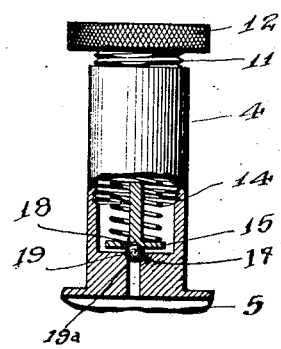
Figure 2:
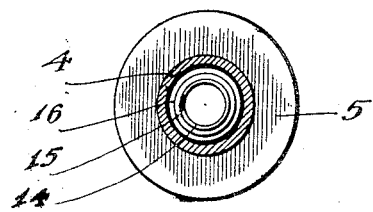
Figure 3:
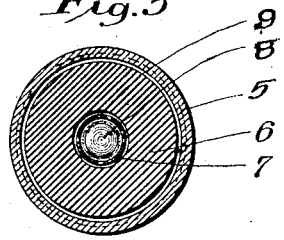

Referring to the drawings: Figure 1 is an enlarged longitudinal section through the upper portion of a tire valve stem showing the device in position thereon. Fig. 2 is a section on line $x^2$—$x^2$, Fig. 1. Fig. 3 is a section on line $x^3$—$x^3$, Fig. 1. Fig. 4 is a sectional view of the lower portion of the device, showing the valve inverted with a ball interposed between the valve and its seat.

1 designates the body of the tire valve stem having a reduced threaded end 2. 3 designates the valve pin, all of which are of the usual construction.

4 is a barrel with an enlarged lower internally threaded socket 5, which is adapted to be screwed on the reduced end 2. Within the socket 5 is a rubber gasket 6, which seats against the upper rim of the reduced end 2 and prevents air leakage.

7 is a plate with a cupped center portion 8, which is adapted to depress the valve pin 3 to permit the air to pass from the tire into the automatic pressure relief valve. The cupped portion 8 has several perforations 9 for the air to pass therethrough.

The barrel 4 is internally threaded at 10 and screwed therein is a sleeve 11 with a thumb piece 12 for turning it and having several air escaping orifices 13. A coil compression spring 14 is arranged within the barrel 4, and one end bears against thumb piece 12, and the other end bears against the head of a valve pin 15, there being a rubber packing 16 under the valve head 15, which seats against an abutment or seat 17 formed inside the shell 4. The valve head 15 is formed with a central conical portion 18, and the abutment 17 is formed with a central conical portion 19. If the rubber gasket becomes lost, the valve may be inverted as shown in Fig. 4, and a ball 19ª inserted between the valve head 15 and abutment 17, the ball being held centrally by the conical portion 18 in valve head 15, and by conical portion 19 in abutment 17.

In operation the pressure of spring 14 holds the valve 15 with rubber washer 16 against abutment 17 with sufficient pressure to maintain the air within the tire until the pressure of the air has increased to such an extent that it overcomes the pressure of spring 14, whereupon the pressure of air opens valve 15, and allows air to escape from the tire, the air after passing valve 15 escaping through the perforations 13. By regulating the thumb piece 12 any desired pressure of spring 14 may be secured to cause the valve to automatically open at the desired definite pressure.

As the device is screwed to the reduced end of the valve stem 2 it permits the usual dust cap not shown to be applied to the valve stem so that the automatic relief valve is housed and protected from injury.

What I claim is:—

An automatic relief valve for tires, comprising a shell having an internally threaded socket adapted to be screwed on the end of the tire valve stem, means in said socket for depressing the valve pin of the tire valve, and said shell having an abutment, and a reversible valve provided on one of its faces with a rubber seat for engagement with said abutment when the valve is in one position, and having a conical recess in its opposite face to receive a ball resting against said abutment when the position of the valve is reversed, a sleeve screwed into said shell, a compression spring within the shell between the valve and sleeve, the sleeve having a thumb piece on the end thereof for adjustment.

In testimony whereof, I have hereunto set my hand at Hanford Cal. this 2nd day of June 1913.

VIRGIL O. JARVIS.

In presence of—
 GEO. E. WORTHINGTON,
 ED. T. SMITH.